(12) United States Patent
Harrison

(10) Patent No.: US 9,287,788 B2
(45) Date of Patent: Mar. 15, 2016

(54) RESONANT CONVERTER USING VARIABLY DELAYED OUTPUT SWITCHING

(75) Inventor: Michael John Harrison, Petaluma, CA (US)

(73) Assignee: Eaton Industries Company, Christchurch (NZ)

( * ) Notice: Subject to any disclaimer, the term of this patent is extended or adjusted under 35 U.S.C. 154(b) by 96 days.

(21) Appl. No.: 13/992,164

(22) PCT Filed: Dec. 14, 2011

(86) PCT No.: PCT/NZ2011/000260
§ 371 (c)(1),
(2), (4) Date: Aug. 15, 2013

(87) PCT Pub. No.: WO2012/081998
PCT Pub. Date: Jun. 21, 2012

(65) Prior Publication Data
US 2013/0314951 A1    Nov. 28, 2013

Related U.S. Application Data

(60) Provisional application No. 61/423,276, filed on Dec. 15, 2010.

(51) Int. Cl.
*H02M 3/335* (2006.01)
*H02M 3/338* (2006.01)
*H02M 1/00* (2007.01)

(52) U.S. Cl.
CPC ........ *H02M 3/33523* (2013.01); *H02M 3/3387* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC .............. H02M 2001/0058; H02M 2001/0032
USPC ................................ 363/17, 20, 21.01–21.18
See application file for complete search history.

(56) References Cited

U.S. PATENT DOCUMENTS

| | | | | | |
|---|---|---|---|---|---|
| 4,953,068 | A | * | 8/1990 | Henze | 363/17 |
| 5,909,362 | A | * | 6/1999 | Adams | 363/21.03 |
| 7,599,198 | B2 | * | 10/2009 | Tao et al. | 363/17 |
| 7,675,758 | B2 | * | 3/2010 | Artusi et al. | 363/21.01 |
| 8,638,571 | B2 | * | 1/2014 | Tschirhart et al. | 363/17 |

(Continued)

OTHER PUBLICATIONS

Xiaodong Li et al; "Analysis and Design of High-Frequency Isolated Dual-Bridge Series Resonant DC/DC Converter", IEEE Transactions on Power Electronics, IEEE Service Center, Piscataway, NJ, US, vol. 24, No. 4, pp. 850-862, Apr. 2010.

(Continued)

*Primary Examiner* — Timothy J Dole
*Assistant Examiner* — Yusef Ahmed
(74) *Attorney, Agent, or Firm* — Myers Bigel & Sibley, P.A.

(57) ABSTRACT

A resonant converter including: a resonant tank, a switching circuit that connects the resonant tank to a power supply according to a first switching sequence, a synchronous rectifier circuit that supplies power to an output, wherein the rectifier circuit is switched according to a second switching sequence, and a phase delay module arranged to delay the second switching sequence with respect to the first switching sequence to achieve a desired power output, and a method of controlling the same.

23 Claims, 6 Drawing Sheets

(56) References Cited

U.S. PATENT DOCUMENTS

| | | | |
|---|---|---|---|
| 2007/0263421 A1* | 11/2007 | Kyono | 363/127 |
| 2008/0130322 A1* | 6/2008 | Artusi et al. | 363/21.01 |
| 2008/0232141 A1* | 9/2008 | Artusi et al. | 363/21.01 |
| 2009/0016083 A1* | 1/2009 | Soldano et al. | 363/20 |
| 2009/0196072 A1* | 8/2009 | Ye | 363/17 |
| 2009/0303753 A1* | 12/2009 | Fu et al. | 363/20 |
| 2010/0109571 A1* | 5/2010 | Nishino et al. | 315/307 |
| 2010/0135045 A1* | 6/2010 | Inoue | 363/17 |
| 2010/0165667 A1* | 7/2010 | Artusi et al. | 363/21.01 |
| 2010/0182803 A1* | 7/2010 | Nan et al. | 363/21.02 |
| 2010/0226150 A1* | 9/2010 | Thomas et al. | 363/21.06 |
| 2010/0232180 A1* | 9/2010 | Sase et al. | 363/17 |
| 2011/0103097 A1* | 5/2011 | Wang et al. | 363/17 |
| 2011/0128758 A1* | 6/2011 | Ueno et al. | 363/17 |
| 2011/0194206 A1* | 8/2011 | Sase et al. | 360/75 |
| 2011/0205761 A1* | 8/2011 | Tschirhart et al. | 363/21.02 |
| 2011/0267844 A1* | 11/2011 | He et al. | 363/21.02 |
| 2012/0033453 A1* | 2/2012 | Gong | 363/21.02 |
| 2012/0147629 A1* | 6/2012 | Mao et al. | 363/17 |

OTHER PUBLICATIONS

Inoue S et al; A Bi-Directional Isolated DC/DC Converter as a Core Circuit of the Next-Generation Medium-Voltage Power Conversion System, Power Electronics Specialists Conference 2006. Pesc '06. 37th, IEEE Jeju, Korea, 7 pages, Jun. 2006.

International Search Report, corresponding app. No. PCT/NZ2011/000260, mailed Aug. 23, 2012.

* cited by examiner

Figure 5A
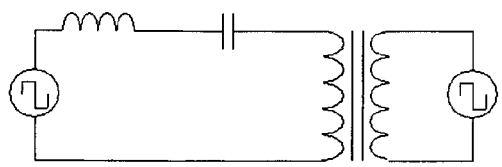
Primary LC Resonant Tank
Figure 5B
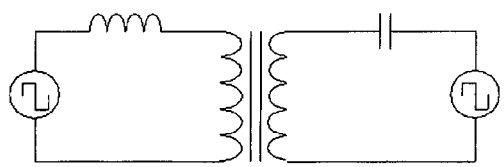
Primary L, Secondary C Resonant Tank
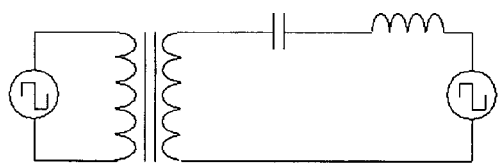
Secondary LC Resonant Tank
Figure 5C
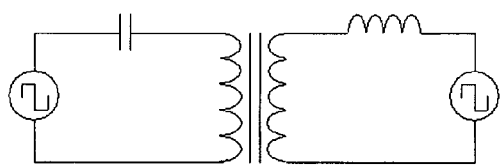
Primary C, Secondary L Resonant Tank
Figure 5D
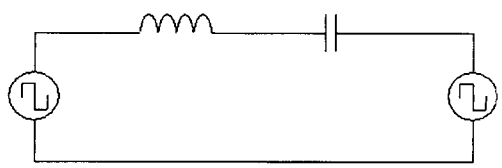
Non isolated version
Figure 5E

RESONANT CONVERTER USING VARIABLY DELAYED OUTPUT SWITCHING

RELATED APPLICATIONS

The present application is a 35 U.S.C. §371 national phase application of PCT International Application No. PCT/NZ2011/000260, having an international filing date of Dec. 14, 2011, claiming priority to U.S. Provisional Patent Application No. 61/423,276, filed Dec. 15, 2010. The disclosures of each application are incorporated herein by reference in their entireties. The above PCT International Application was published in the English language and has International Publication No. WO 2012/081998.

FIELD OF THE INVENTION

The present invention relates to an improved resonant converter and methods of operating. In particular, the present invention relates to an improved resonant converter with a synchronous rectifier circuit and method of controlling the same.

BACKGROUND

Over the history of development of switched mode power supply systems (SMPS) or resonant converters, the rectifier circuit side of the converter has increased in complexity.

In traditional resonant SMPS, the rectifier circuit portion of the SMPS included conventional semiconductor diode rectification components, which rectified the voltage signal produced by the resonant tank portion of the converter. In order to control the output voltage of the converter, the frequency at which the resonant tank was switched was varied.

FIG. 1 shows a typical known circuit topology of a series resonant LLC converter with conventional diode rectifiers. A DC input voltage source 101 is provided to a resonant tank 103 (a series inductor (Lr) and capacitor (Cr)) through the operation of two switches (105A, 105B), which are controlled by a variable frequency oscillator 107. By adjusting the variable frequency, the impedance of a second inductor 109 (Lm) is changed to adjust the current that flows through the resonant tank 103. This in turn causes the output voltage (Vout) to be controlled. That is, the transfer function of the converter is frequency dependent. An isolation transformer 111 is used to isolate the input and output portions of the circuit. The conventional diode components (113A, 113B) rectify the current produced on the secondary side of the isolation transformer 111 and feed this current to an output capacitor 115, which is used to smooth the output voltage signal.

In order to make this form of converter more efficient, synchronous rectification was introduced. The conventional rectifier diode components were replaced with synchronous rectification (SR) MOSFET (Metal Oxide Semiconductor Field Effect Transistor) devices. The MOSFET devices were controlled to emulate the operation of the conventional semiconductor diodes by driving the gate nodes of the MOSFETS.

For example, a typical SR circuit is shown in FIG. 2, where two MOSFET devices (201A, 201B) have replaced the conventional diode rectifier components (113A, 113B) of FIG. 1. Apart from the conventional diode components, the circuit in FIG. 2 contains the same components as shown in FIG. 1 and the same reference numerals have been used. An example method of controlling such a SR circuit is to turn the first MOSFET device 201A ON using a gate drive signal 203A when it is desired that the device is to emulate the conventional diode in a forward conducting mode, i.e. the MOSFET device is switched ON so that the channel conducts in the reverse direction from source to drain. The first MOSFET device 201A is then switched OFF using the gate drive signal 203A to stop the channel from conducting in a forward direction from drain to source, thus causing the MOSFET device to act as a diode in reverse bias mode. The second device 201B may then be operated in a similar manner using gate drive signal 203B for the opposing portion of the signal fed from the isolating transformer.

However, the introduction of a switching control system for the synchronous rectification has led to more complex control mechanisms. Both the turn-on and turn-off times for the SR transistors need to be accurately controlled in order to achieve the maximum efficiency gains afforded by incorporating SR transistors while ensuring that the SR transistor switching does not adversely affect the output voltage control.

Further, although the inclusion of a second inductor (Lm) has provided additional control over the output voltage, this has led to increased production costs as well as resulting in more bulky systems due to the extra inductor component required.

Also, systems using the above described approaches are generally rated or designed for operation for a defined maximum voltage. The control of the system using the above described techniques allows the converter to operate at a lower voltage than the rated maximum voltage. However, operation of the converter at a voltage less than the maximum rated value results in the system not operating in the optimal range, thus losing efficiency.

An object of the present invention is to provide a resonant converter circuit with a simpler control system.

A further object of the present invention is to provide a resonant converter circuit with a reduced number of inductors.

A further object of the present invention is to provide a method of controlling a resonant converter in a simpler manner.

Each object is to be read disjunctively with the object of at least providing the public with a useful choice.

The present invention aims to overcome, or at least alleviate, some or all of the afore-mentioned problems.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components that the use directly references, but optionally also the inclusion of other non-specified components or elements.

According to one aspect, the present invention provides a resonant converter including: a resonant tank, a switching circuit that connects the resonant tank to a power source according to a first switching sequence, a synchronous rectifier circuit that supplies power to an output, wherein the rectifier circuit is switched according to a second switching sequence that is modified with respect to the first switching sequence to achieve a desired power output.

According to a further aspect, the present invention provides a method of controlling a resonant converter including the steps of: applying a first switching sequence to a switching circuit to connect a resonant tank to a power supply, supplying power to an output via a synchronous rectifier circuit, and switching the rectifier circuit according to a second switching sequence that is modified with respect to the first switching sequence to achieve a desired power output.

BRIEF DESCRIPTION OF THE DRAWINGS

Embodiments of the present invention will now be described, by way of example only, with reference to the accompanying drawings, in which:

FIGS. 5A-5E show alternative LC arrangements for a phase shift controlled series LC resonant converter according to various embodiments of the present invention;

DETAILED DESCRIPTION OF THE INVENTION

First Embodiment

Figure 1:
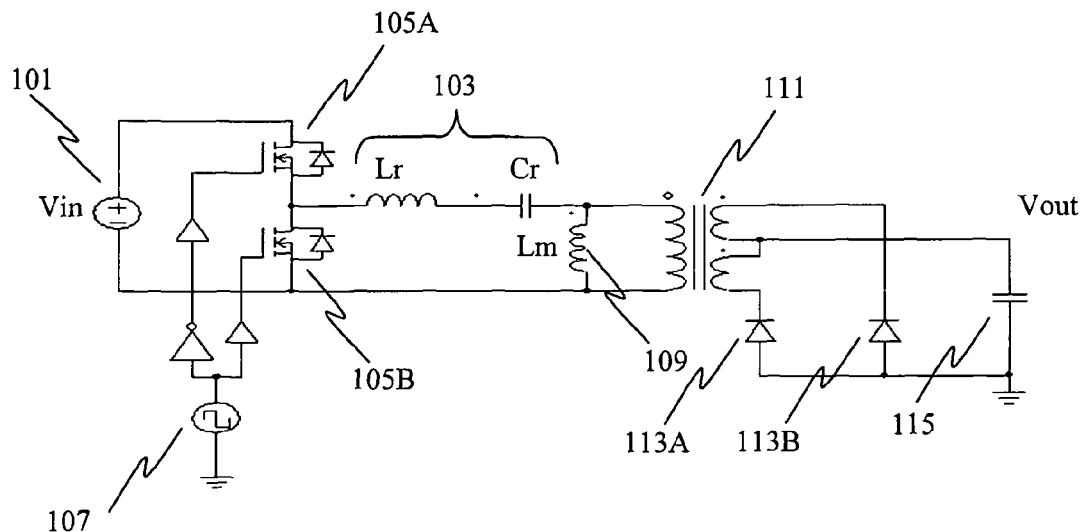
FIG. 1 shows a typical circuit topology for a series LLC resonant converter.
Figure 2:
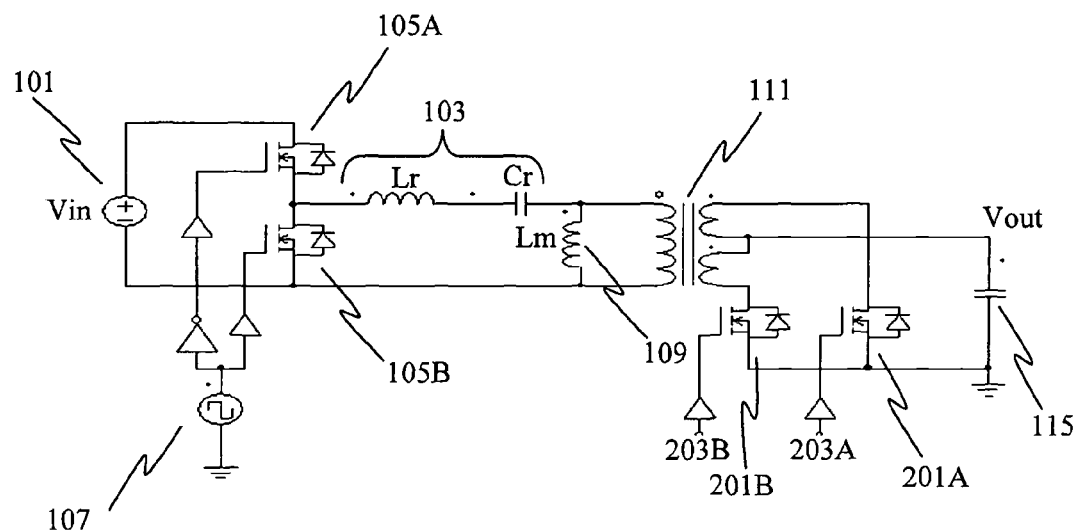
FIG. 2 shows a typical circuit topology for a series LLC resonant converter with synchronous rectification.
Figure 3:
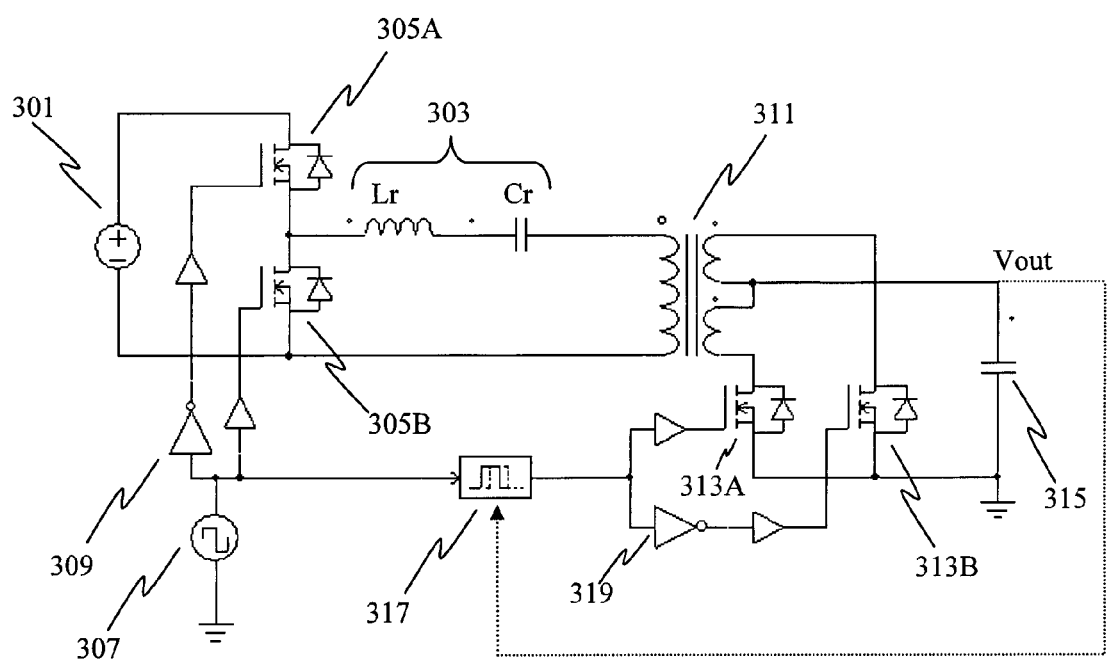
FIG. 3 shows a phase shift controlled series LC resonant converter with output synchronous rectification according to an embodiment of the present invention.

FIG. 3 shows a phase shift controlled series LC resonant converter with output synchronous rectification according to this embodiment of the present invention.

A DC voltage source 301 supplies power to the converter. A resonant tank 303 in the form of a series inductor (Lr) and capacitor (Cr) is charged with power from the DC source 301 as well as discharged through the activation of primary switching devices (305A, 305B), which are arranged using a half bridge configuration. Typically the values for Lr & Cr are designed for an impedance value in the range of 50% to 100% of the minimum load impedance). According to this embodiment, the primary switching devices (305A, 305B) are metal oxide semiconductor field effect transistors (MOSFETs). It is to be noted that in this embodiment, only a single inductor device Lr is required within the resonant circuit.

The primary switching devices (305A, 305B) are driven by a first switching sequence (switching signal) generated in this example by a fixed frequency generator or oscillator 307. The frequency of the generator is chosen to suit the transistor and transformer/inductor characteristics, which is typically in the range of 1 kHz to 1 MHz) The first switching signal is fed to the gate of a first switching device 305A through an inverter 309, and fed directly to the gate of a second switching device 305B.

The series resonant tank 303 is located on a primary side of an isolation transformer 311 and feeds power to the primary winding of the isolation transformer 311. On the secondary side of the transformer 311, the power is transferred from secondary windings to a rectifier circuit which includes two secondary switching devices (313A, 313B), which in this embodiment are MOSFET devices. The two secondary switching devices of the rectifier circuit are arranged in a push pull configuration.

It will be understood that alternative switching devices may be used for the primary and secondary switching devices, such as, for example, any suitable active switch device such as a BJT (Bipolar Junction Transistor), IGBT (Insulated Gate Bipolar Transistor), JFET (Junction Gate Field Effect Transistor), SCR (Silicon Controlled Rectifier) and GTO (Gate Turn-off Thyristor) device.

On the output of the rectifier circuit is provided an output capacitor 315 to provide smoothing of the output voltage signal (Vout).

A second switching signal drives the gates of the two secondary switching devices (313A, 313B). The second switching signal is developed by modifying the first switching signal used to drive the primary switching devices (305A, 305B). In this embodiment the first switching signal from the frequency generator 307 is modified by a phase delay module 317, thus producing the second switching signal for the synchronous rectifier which is a phase delayed version (or phase shifted version) of the first switching signal. The second switching signal or sequence is fed directly to a gate of a first secondary switching device 313A of the rectifier circuit and fed via an inverter 319 to a second secondary switching device 313B of the rectifier circuit. This arrangement provides a synchronous rectification circuit driven using a push-pull mode. The gate timing signals are digital signals with two states: ON & OFF.

The output voltage Vout is fed back to the phase delay module to adjust how much phase delay is applied to the first switching signal to produce the second switching signal.

By adjusting the synchronisation (or the phase) of the first and second switching signals, the output voltage is varied as follows. The resonant tank is continually producing power that resonates from a maximum to a minimum value. If the first and second switching signals are in phase, then the output of the rectifier circuit will be a rectified version of the maximum power signal being generated by the resonant tank. Whereas, if there is a phase delay only a portion of the maximum power generated by the resonant tank will be transferred through the rectifier circuit as the rectifiers will be rectifying when the tank is not at its maximum power.

According to this embodiment, the fixed frequency generator generates a square wave gate drive signal for driving the primary switching devices. It will be understood that the gate drive signal may be in any other suitable form other than a square wave.

FIGS. 4A-4E show example waveforms generated by the circuit shown in FIG. 3.

Figure 4A:
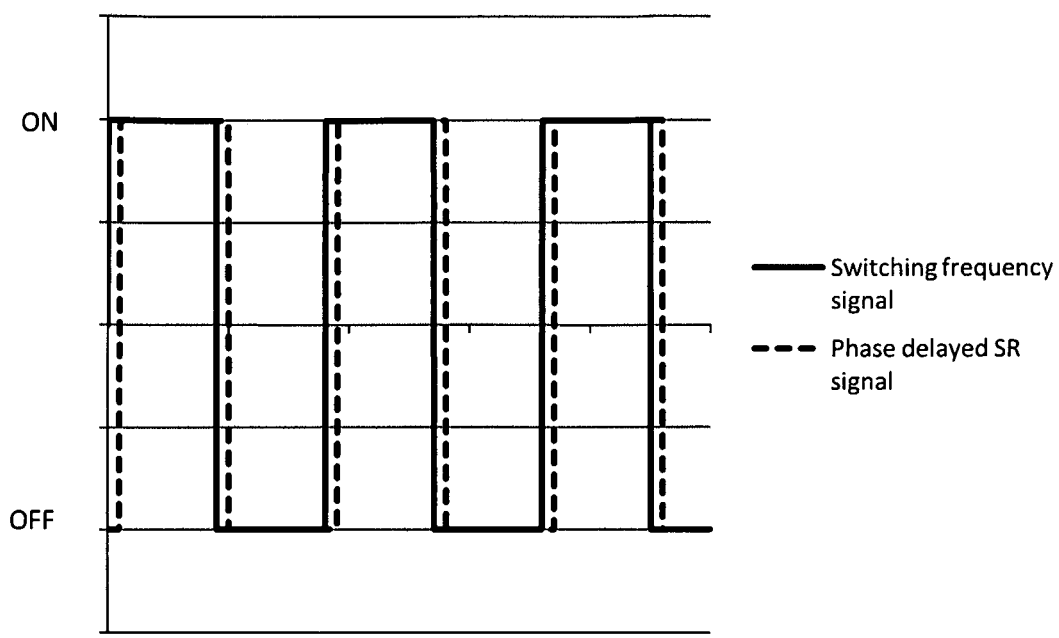
FIGS. 4A-4E show example waveforms generated by the circuit shown in FIG. 3.

FIG. 4A shows the first switching frequency signal generated by the switching frequency generator 307 as a solid square wave. The second switching signal developed by the phase delay module 317, used to drive the synchronous rectifier circuit, is shown as a phase delayed dashed square wave.

Figure 4B:
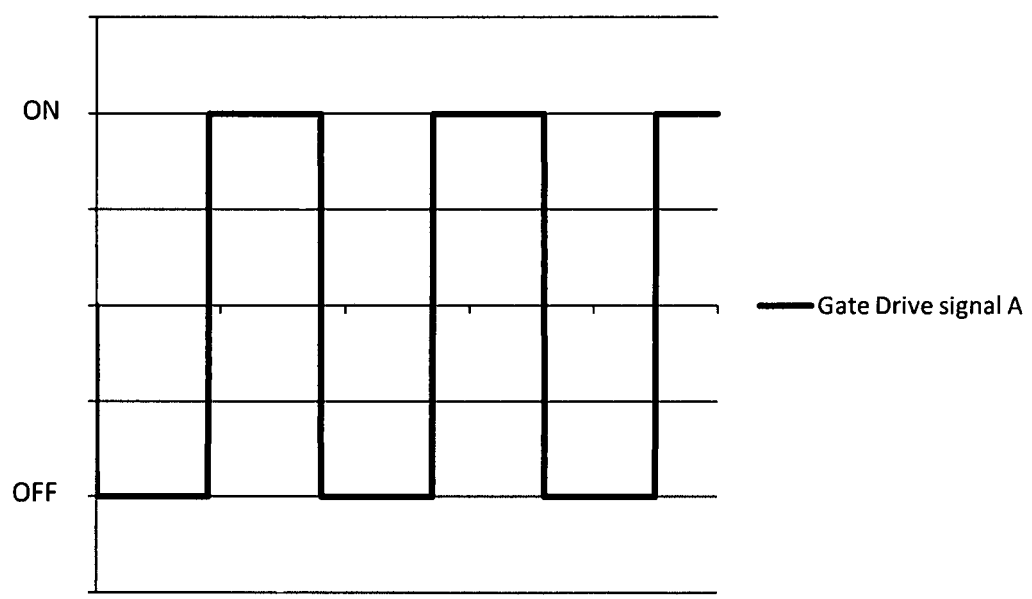
Figure 4C:
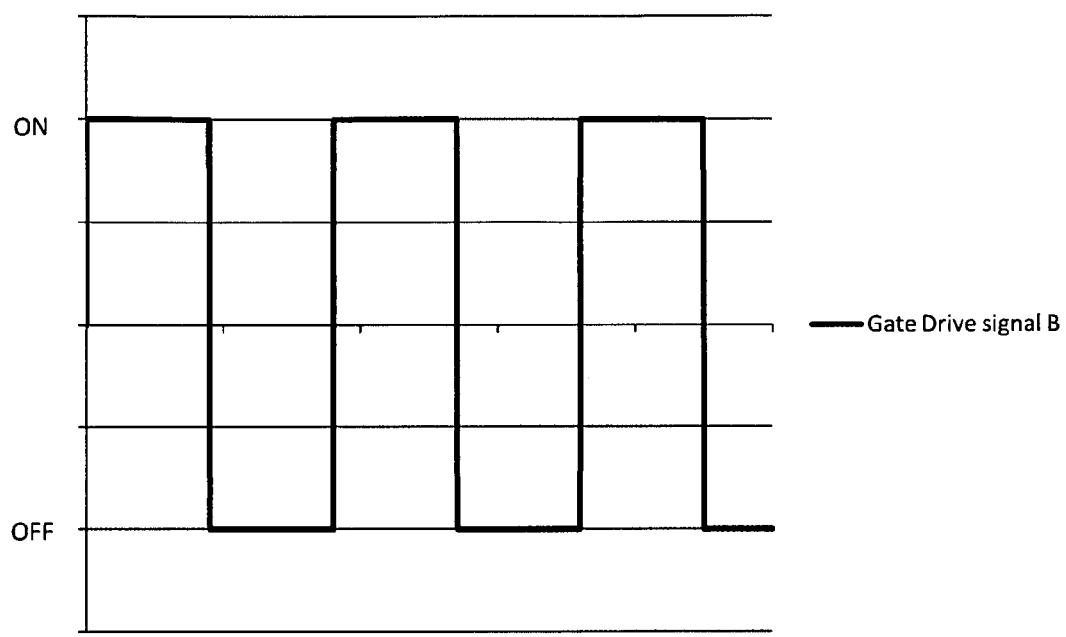

FIG. 4B shows an inverted first gate drive signal A for driving a first primary switching device 305A via the inverter 309. FIG. 4C shows a second gate drive signal B for driving the second primary switching device 305B.

Figure 4D:
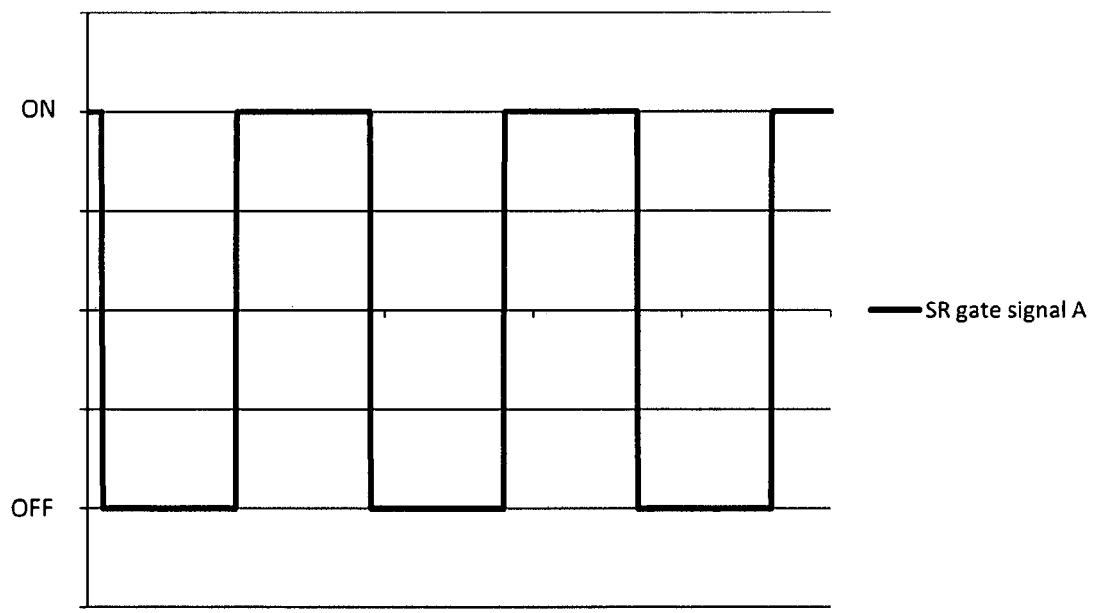
Figure 4E:
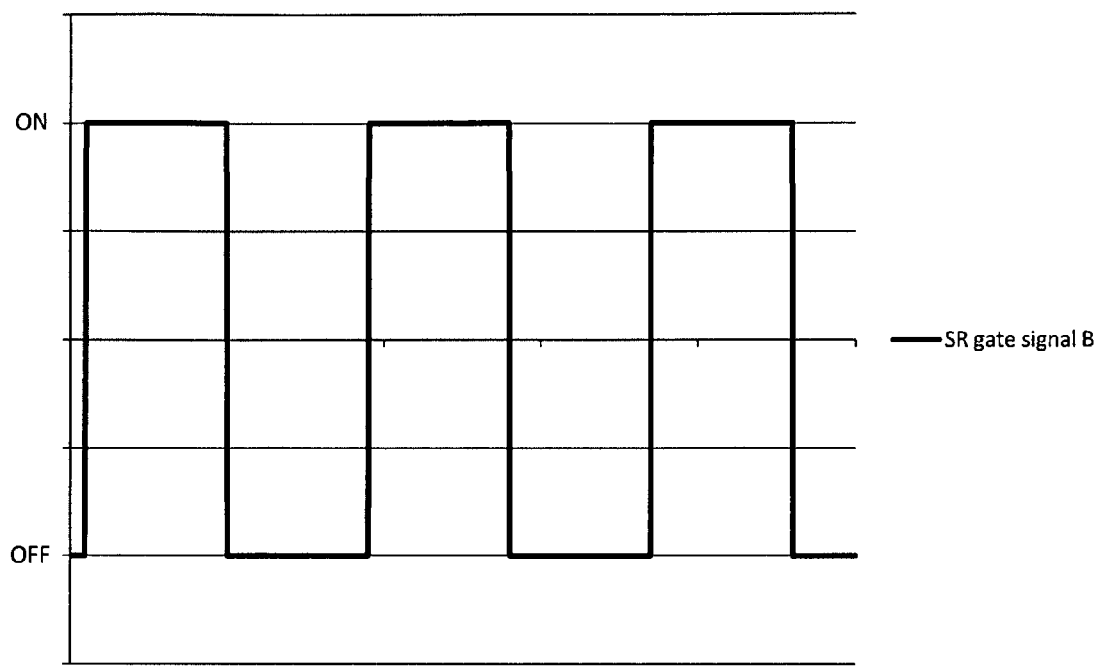

FIG. 4D shows an inverted phase delayed version of the solid line switching frequency signal shown in FIG. 4A. FIG. 4D shows a first SR gate drive signal A used to drive the synchronous rectifier gate of a first secondary switching device 313B via the inverter 319. FIG. 4E shows a second SR gate drive signal B used to drive the gate of a second synchronous rectifier switching device 313A.

The voltage output may be fed back to the phase delay module to control how much the second switching sequence is to be delayed compared to the first switching sequence. That is, a nominal or desired output voltage value may be chosen and an error signal developed based on the difference between the nominal value and the measured output voltage to create an error signal. The error signal may then be used to increase the phase delay to reduce the output voltage, or reduce the phase delay (i.e. by varying the alignment of the first and second switching sequences) to increase the output voltage.

Therefore, it can be seen that the circuit can be designed to produce a nominal output voltage based on a fixed resonant frequency signal and fixed resonant tank values which matches the input voltage. The output voltage may then be adjusted up or down using the phase delay module so that the converter can operate either as a boost converter or a buck converter. Further, the turns ratio of the isolation transformer may be set to provide the nominal output voltage required, thus enabling the operation range for the converter to be biased toward either the buck mode or boost mode region.

The herein described converter may be designed to operate in various different power ranges. For example, the converter may be arranged to operate in a power range from approximately 50 W to 5 kW. More specifically, the converter may be arranged operate in a power range from approximately 500 W-5 kW.

The herein described converter may be used in many different products to provide suitable power conversion. For example, the converter herein described may be used in telecommunication equipment power supplies, flat screen televisions, computers monitors, computer servers, computers and laptops. Due to various topologies used in the herein described embodiments, the transformer gap may be reduced from what is normally used in standard converter circuitry. The transformer gap may be set dependant on the chosen transformer core material and operational frequency.

Optionally, the fixed frequency signal generated by the frequency oscillator may be passed through a dither module in order to spread the frequency spectrum and minimise electromagnetic interference (EMI). The dither control may automatically cause the fixed frequency signal to operate within a defined dither range.

The primary and secondary switching devices are controlled such that they perform ZVT (Zero Voltage Transition) switching under all operating conditions. This is an improvement over the conventional LLC circuit which can only achieve ZVT switching on the SR transistors while operating in the LLC "buck" region.

Alternative Embodiments

Various alternative topology configurations are now described. As described in the above preferred embodiment, the primary switching devices are configured using a half bridge drive configuration and the secondary devices are configured using a push pull drive configuration. As an alternative, a full bridge drive configuration with four switching devices may be used for the primary switching and/or the secondary switching. Further, the push pull drive configuration may be used for the primary switching, and the half bridge drive configuration may be used for the secondary switching. This provides a total of nine different possible configurations, with three independent alternatives for each of the primary and secondary switching circuits.

FIGS. 5A-5E show various LC arrangements for a phase shift controlled series LC resonant converter according to various embodiments of the present invention. For example, there may be practical considerations that make it a better choice from a design perspective to locate the inductor and capacitor components on a particular side of the transformer.

According to FIG. 5A, it can be seen that the LC components of the resonant tank are located on the primary side of the transformer, as described above in the preferred embodiment.

According to FIG. 5B, the inductor component of the resonant tank is located on the primary side of the transformer and the capacitor component is located on the secondary side of the transformer.

According to FIG. 5C, both the LC components of the resonant tank are located on the secondary side of the transformer.

According to FIG. 5D, the capacitor component of the resonant tank is located on the primary side of the transformer and the inductor component is located on the secondary side of the transformer.

According to FIG. 5E, a non-isolated version of the converter is shown, where no transformer is provided to separate the input side form the output side.

As a further alternative, an auto transformer may be used in place of the isolating transformer if primary to secondary voltage/current transformation is required but isolation is not.

Optionally, a short circuit monitoring system may be implemented using the herein described converter. Upon detection of a short circuit, the system may increase the frequency of the resonant switching signal to reduce the power in the resonant tank. That is, the increased frequency causes the resonant tank to operate in an inefficient manner thus reducing its storage capacity. Further, the system may inhibit the secondary switching devices so that they are no longer attempting to provide an output.

The herein described embodiments provide several advantages over the conventional converter topologies as follows.

- Fewer components are required. In particular, only a single inductor is required as LM is no longer required.
- A simpler control mechanism is used to control the power transfer and output voltage of the converter.
- The converter operates with an efficiency that is considerably better than a converter without SR and better than a conventional LLC with SR using conventional variable frequency control.
- Only one control parameter is required versus three for the conventional LLC converter.
- The output voltage may be controlled to a zero voltage output.
- The synchronous rectification switching devices always operate using ZVT switching.
- There is no fringe flux on the transformer.
- There is reduced fringe flux on the inductor of the resonant tank.
- There is a lower RMS resonant current flowing through the resonant tank.
- The circuit is insensitive to gate drive delays.
- The topology is fully bi-directional and symmetrical.

Further Embodiments

It will be understood that the embodiments of the present invention described herein are by way of example only, and that various changes and modifications may be made without departing from the scope of invention.

It will be understood that as an alternative, the fixed frequency generator or oscillator described above in the various embodiments may be replaced with a variable frequency generator or oscillator. The frequency of the variable oscillator may be modified using a feedback circuit that monitors the output voltage and adjusts the variable frequency accordingly to ensure the correct power transfer is provided from the resonant tank to the output. The feedback circuit may include proportional feedback, proportional and integral (PI) feedback or proportional, integral and derivative (PID) feedback depending on the complexity and accuracy required. Adjustment of the variable frequency may be performed in addition to the phase control of the synchronous rectifier circuit in order to provide additional feedback control.

Further, it will be understood that as an alternative, additional inductor devices may be provided in connection with the resonant tank in order to provide an improved resonant frequency control system.

The invention claimed is:

1. A resonant converter including:
   a resonant tank;
   a switching circuit that connects the resonant tank to a power supply according to a first switching sequence;
   a synchronous rectifier circuit that supplies power to an output; wherein the rectifier circuit is switched according to a second switching sequence; and
   a phase delay module arranged to delay the second switching sequence with respect to the first switching sequence by a variable phase delay to achieve a desired power output, said phase delay module configured to use feedback from the output to develop an error signal based on a difference between a nominal value of a voltage at the output and an actual value of the voltage at the output, said error signal having a characteristic that varies in response to a first change in the actual value of the voltage at the output to thereby cause a change in the variable phase delay and a corresponding second change in the actual value of the voltage at the output that results from the change in the variable phase delay;
   wherein the second switching sequence is a phase delayed version of the first switching sequence and wherein a duty cycle of the first switching sequence is equivalent to a duty cycle of the second switching sequence.

2. The resonant converter of claim 1 further including a transformer arranged between the power supply and the output.

3. The resonant converter of claim 2, wherein the transformer is one of an isolation transformer and an auto transformer.

4. The resonant converter of claim 2, wherein the resonant tank includes an inductor and a capacitor in series on a primary side of the transformer.

5. The resonant converter of claim 4, wherein the inductor in series with the capacitor is a first inductor and the resonant tank is independent of a second inductor in parallel with the primary side of the transformer.

6. The resonant converter of claim 2, wherein the resonant tank includes an inductor and a capacitor in series on a secondary side of the transformer.

7. The resonant converter of claim 2, wherein the resonant tank includes an inductor on a primary side of the transformer and a capacitor in series on a secondary side of the transformer.

8. The resonant converter of claim 2, wherein the resonant tank includes an inductor on a secondary side of the transformer and a capacitor in series on a primary side of the transformer.

9. The resonant converter of claim 1, wherein the resonant tank includes an inductor and capacitor in series, and the power supply is not isolated from the output.

10. The resonant converter of claim 1, wherein the switching circuit is arranged as a half bridge drive circuit.

11. The resonant converter of claim 1, wherein the resonant tank includes an inductor and a capacitor in series.

12. The resonant converter of claim 1, wherein the resonant tank includes a single inductor.

13. The resonant converter of claim 1, wherein the switching circuit and synchronous rectifier circuit employ Zero Voltage Transition (ZVT) switching.

14. The resonant converter of claim 1 further arranged to adjust the alignment of the first and second switching sequences dependent on the desired output.

15. The resonant converter of claim 1, wherein the first switching sequence is at a fixed operating frequency.

16. The resonant converter of claim 15, wherein the first switching sequence is varied to spread the frequency spectrum.

17. The resonant converter of claim 1, wherein the first switching sequence is at a variable operating frequency.

18. The resonant converter of claim 1, wherein the switching circuit further includes two or more switching devices arranged to charge and discharge the resonant tank.

19. The resonant converter of claim 1, wherein a first switching device is connected between a first node of an inductor forming part of the resonant tank and a first DC power supply node, and a second switching device is connected between the first node of the inductor and a second DC power supply node.

20. The resonant converter of claim 1,
   wherein the switching circuit comprises:
      a first half bridge drive circuit; and
      a driver circuit that drives the first half bridge drive circuit responsive to a first oscillator signal,
   wherein the phase delay module is configured to generate, from the first oscillator signal, a second oscillator signal which is a delayed version of the first oscillator signal, and
   wherein the synchronous rectifier circuit is switched according to the second oscillator signal.

21. The resonant converter of claim 20, wherein the first oscillator signal and the second oscillator signal are fixed frequency signals.

22. A resonant converter including:
   a resonant tank;
   a switching circuit that connects the resonant tank to a power supply according to a first switching sequence having a first duty cycle;
   a synchronous rectifier circuit that supplies power to an output and is switched according to a second switching sequence; and
   a phase delay module arranged to delay the second switching sequence with respect to the first switching sequence by a variable phase delay to achieve a desired power output, said phase delay module configured to use feedback from the output to develop an error signal based on a difference between a nominal value of a voltage at the output and an actual value of the voltage at the output, said error signal having a characteristic that varies in response to a first change in the actual value of the voltage at the output to thereby cause a change in the variable phase delay and a corresponding second change in the actual value of the voltage at the output that results from the change in the variable phase delay.

23. The resonant converter of claim 22, wherein a duty cycle of the first switching sequence is equivalent to a duty cycle of the second switching sequence for all values of the variable phase delay.

* * * * *